United States Patent
Rehm et al.

(10) Patent No.: US 9,158,474 B2
(45) Date of Patent: Oct. 13, 2015

(54) DYNAMIC STORAGE DEVICE LIBRARIES

(71) Applicants: Kevan Flint Rehm, Brooklyn Park, MN (US); Judith Ann Schmitz, Edina, MN (US); Joseph Carl Nemeth, Fort Collins, CO (US)

(72) Inventors: Kevan Flint Rehm, Brooklyn Park, MN (US); Judith Ann Schmitz, Edina, MN (US); Joseph Carl Nemeth, Fort Collins, CO (US)

(73) Assignee: Silicon Graphics International Corp., Fremont, CA (US)

( * ) Notice: Subject to any disclaimer, the term of this patent is extended or adjusted under 35 U.S.C. 154(b) by 220 days.

(21) Appl. No.: 13/831,738

(22) Filed: Mar. 15, 2013

(65) Prior Publication Data
US 2014/0281210 A1 Sep. 18, 2014

(51) Int. Cl.
*G06F 12/00* (2006.01)
*G06F 3/06* (2006.01)
*G06F 11/34* (2006.01)

(52) U.S. Cl.
CPC .............. *G06F 3/0653* (2013.01); *G06F 3/061* (2013.01); *G06F 3/0605* (2013.01); *G06F 3/0635* (2013.01); *G06F 3/0682* (2013.01); *G06F 3/0686* (2013.01); *G06F 11/34* (2013.01)

(58) Field of Classification Search
None
See application file for complete search history.

(56) References Cited

U.S. PATENT DOCUMENTS

2012/0180066 A1* 7/2012 Haustein et al. .............. 718/105

* cited by examiner

*Primary Examiner* — Midys Rojas
(74) *Attorney, Agent, or Firm* — Lewis Roca Rothgerber LLP

(57) ABSTRACT

Tape device paths, library slots and drive information are automatically collected by agents at nodes in a library cluster. The information is reported to a central server database. The central server accesses the information and maps tape devices to path information so an administrator may easily have access to configuration information for the tape device cluster. When a tape device cluster is updated, for example through changes to a device, an added device, device failure or some other reason, the change is detected and the cluster configuration is automatically updated.

12 Claims, 5 Drawing Sheets

DYNAMIC STORAGE DEVICE LIBRARIES

BACKGROUND OF THE INVENTION

1. Field of the Invention

The present invention relates to storage device management. In particular, the present invention relates to tracking node paths and devices in a storage cluster.

2. Description of the Related Art

A cluster management service uses tape libraries in a tiered hierarchical storage system to provide low cost storage to customers. The tape libraries may contain a hundred or more tape drives connected to multiple hosts in a storage cluster. There could be a thousand or more data paths amongst these drives within the cluster. The paths appear and disappear over time as the fabric changes and drives can be added, deleted, replaced and sometimes even fail.

When customers have to configure a large tape library for use with a data storage management system in a mover-node cluster, it can take considerable time to configure all of the possible paths to all of the devices on the nodes in the cluster. If changes are made to the fiber channel storage area network (SAN), all those paths can change, requiring reconfiguration. Configuration of tape drive clusters can cost large amounts of time and resources.

What is needed is an improved method for configuring clusters of tape drive libraries.

SUMMARY OF THE CLAIMED INVENTION

Tape device paths, library slots, and drive information are automatically collected by agents at nodes in a library cluster. The information is reported to a central server database. The central server accesses the information and maps tape devices to path information so an administrator may easily have access to configuration information for the tape device cluster. When a tape device cluster is updated, for example through changes to a device, an added device, device failure or some other reason, the change is detected and the cluster configuration is automatically updated.

An embodiment of a method for automatically tracking tape drive paths may start with receiving tape device path information by a central server. Tape device drive information may be received in library slots and slot location by the central server. Library device paths may be automatically mapped to device drive and slot information.

DETAILED DESCRIPTION

Tape device paths, library slots, and drive information are automatically collected by agents at nodes in a library cluster. The info is reported to a central server database. The central server accesses the information and maps tape devices to path information so an administrator may easily have access to configuration information for the tape device cluster. When a tape device cluster is updated, for example through changes to a device, an added device, device failure or some other reason, the change is detected and the cluster configuration is automatically updated.

Figure 1:
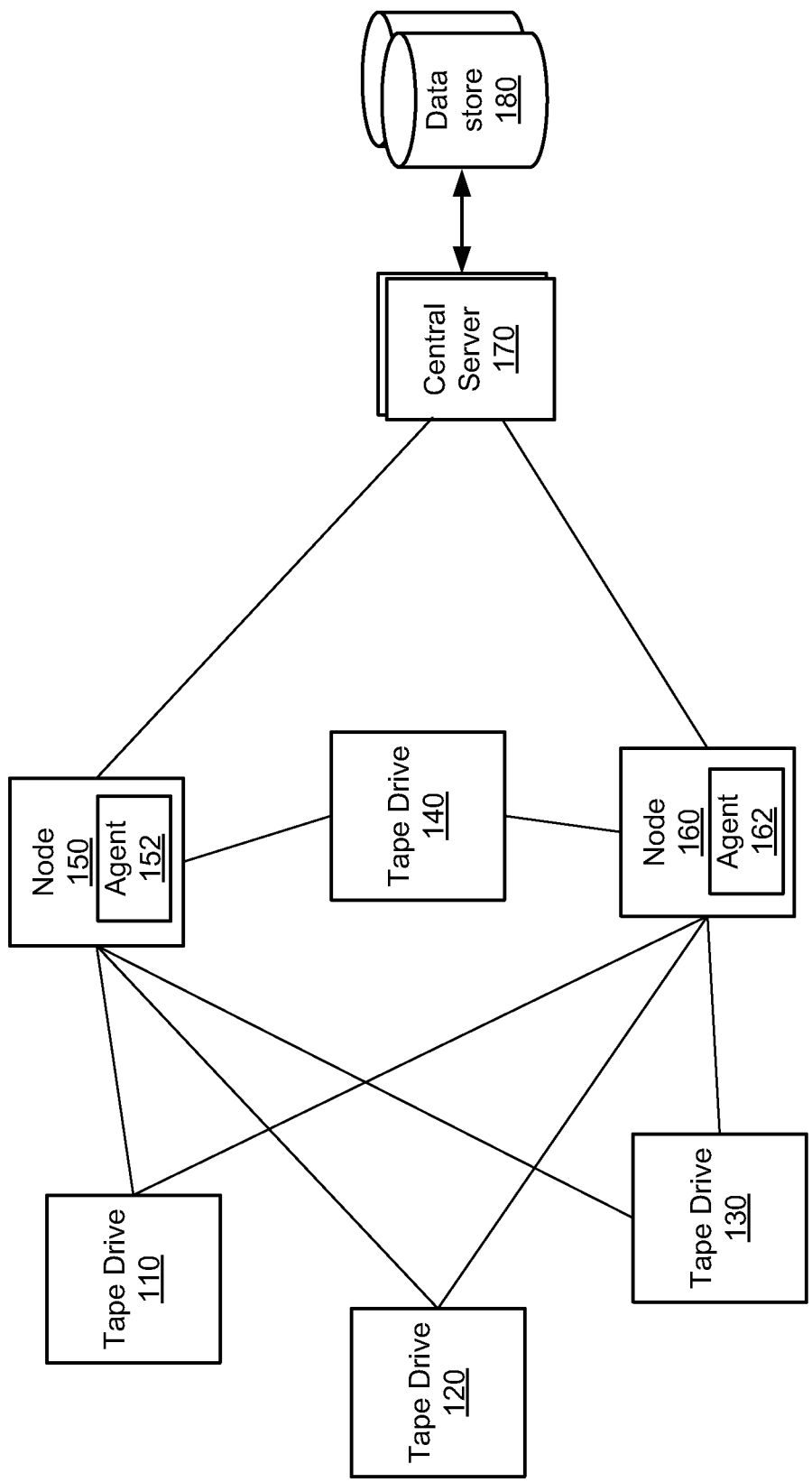
FIG. 1 is a block diagram of a tape library cluster.

FIG. 1 is a block diagram of a tape library cluster. The cluster of FIG. 1 includes tape drives 110, 120, 130 and 140, nodes 150 and 160, central server 170 and data store 180. Tape drives 110-140 may be part of a hierarchical tier of data storage and may provide data storage at low costs with extremely slow access times. Nodes 150 and 160 may communicate with tape devices 110-140 to retrieve data from the devices. The nodes may be implemented as a computing device, another tape device, or other machine. Each node communicates with central server 170. Central server 170 may be implemented with one or more server machines and implements cluster management functionality. Data store 180 may store data about the tape library clusters.

Nodes 150 and 160 each include an agent. Agent 152 on node 150 may collect tape drive path information, tape library slot information, and tape drive information. Agent 152 may collect this information initially at boot up and/or at any time a change is detected to the information. The collected information is transmitted to data store 180 through central server 170.

Figure 2:
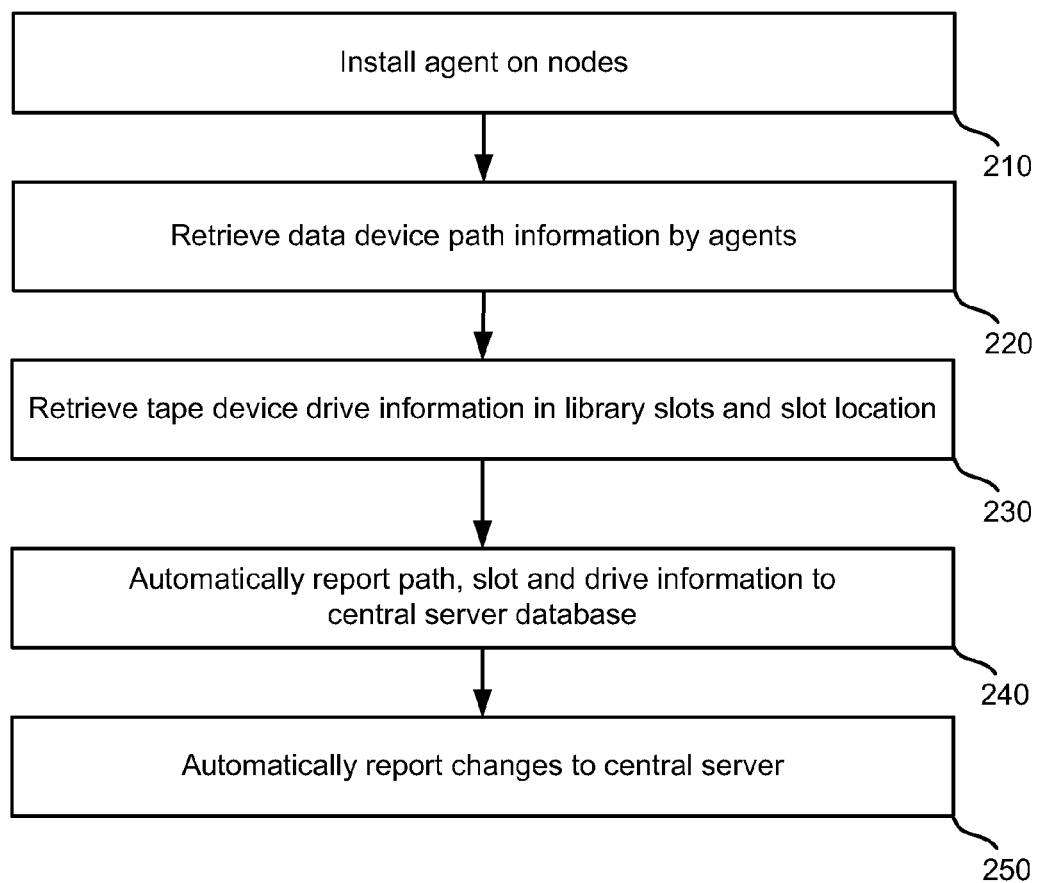
FIG. 2 is a method for automatically reporting tape device cluster information.

FIG. 2 is a method for automatically reporting tape device cluster information. First, an agent is installed on nodes at step 210. In FIG. 1, an agent 152 is installed on node 150 and an agent 162 is installed on node 160. The agents may be implemented as a drive control program or a library control program, that may issue commands to move a tape cartridge from slot to drive and back, thread and unthread a tape cartridge in the drive, or periodically check the operational status of the tape drive and report failures. In some embodiments, the agents may be a supervisory agent that pulls device path information. Data device path information is retrieved by an agent at step 220. The path may indicate the logical path between a tape drive and a host. Tape device drive information is retrieved from library slots and a slot location at step 230. Hence, for each tape device library, the slots of that library are retrieved as well as the devices within each slot. The tape device drive information may include vendor, product and serial number of drive in library slot.

The path, slots, and drive information are automatically reported to a central server database at step 240. The information may be stored, for example in data store 180, for later access by central server 170. Changes in a tape drive configuration are automatically reported at step 250. Automatic reporting of changes in tape drive configuration may include detecting one or more changes, retrieving the one or more changes, and then reporting the one or more changes. The reporting of changes is discussed in more detail below with respect to the method of FIG. 3.

Figure 3:
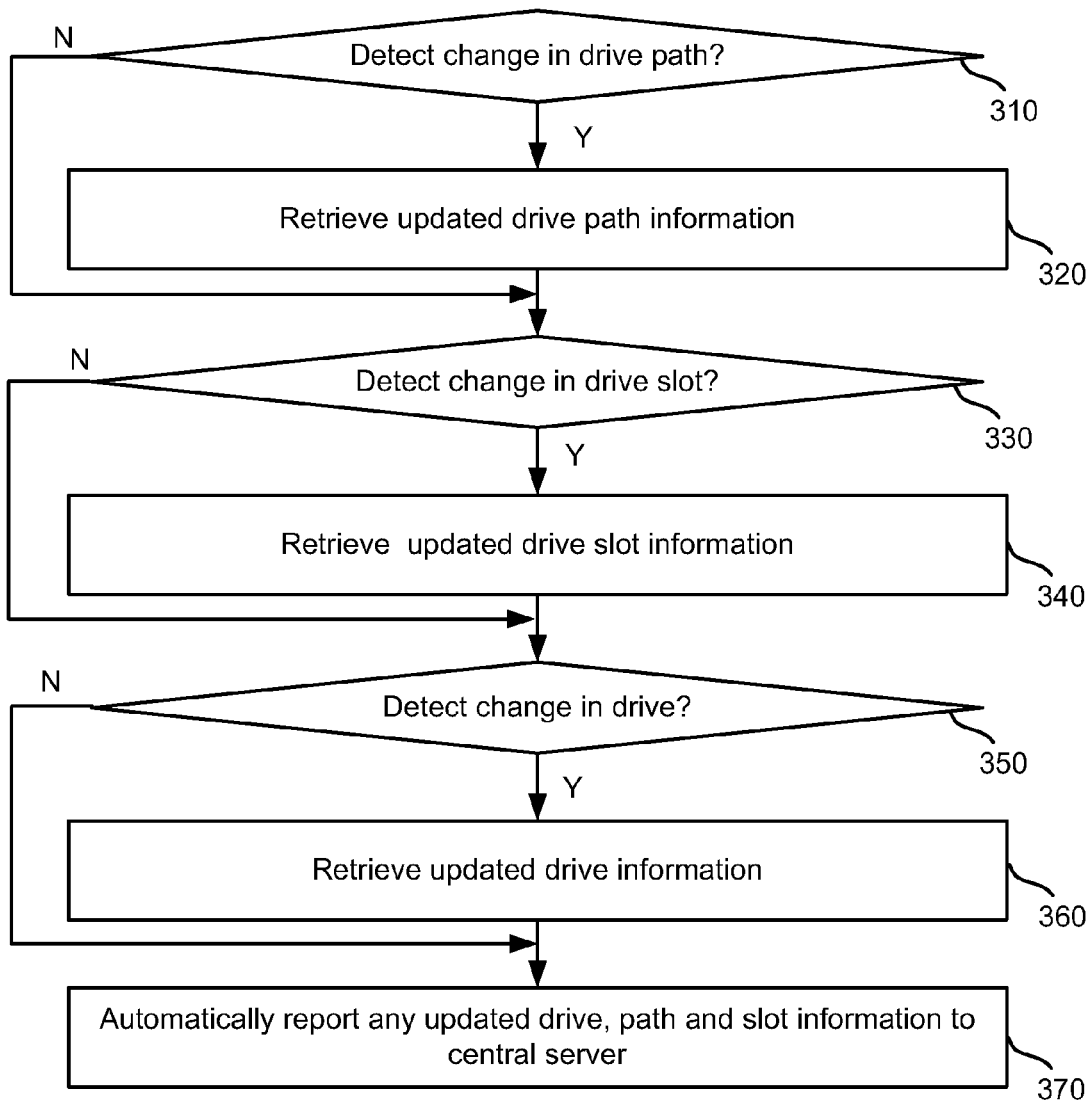
FIG. 3 is a method for automatically sending updated tape device cluster information.

FIG. 3 is a method for automatically sending updated tape drive cluster information. The method of FIG. 3 begins with a determination as to whether a change has been detected in a drive path at step 310. If no change has been detected, the method of FIG. 3 continues to step 330. If a change in the drive path has been detected, the updated drive path information is retrieved at step 320. The method of FIG. 3 then continues to step 330.

A determination is made as to whether a change in a drive slot is detected at step 330. If a drive slot change is not detected, the method continues to step 350. If a drive slot change is detected, the updated drive slot information is retrieved at step 340 and then the method continues to step 350.

A determination is made as to whether there is a change in a drive detected at step 350. If a change in a drive is detected, the updated drive information is retrieved at step 360 and the method of FIG. 3 continues to step 370. If no change in the drive is detected, the node automatically reports any updated drive, path or slot information to central server 170 at step 370.

Figure 4:
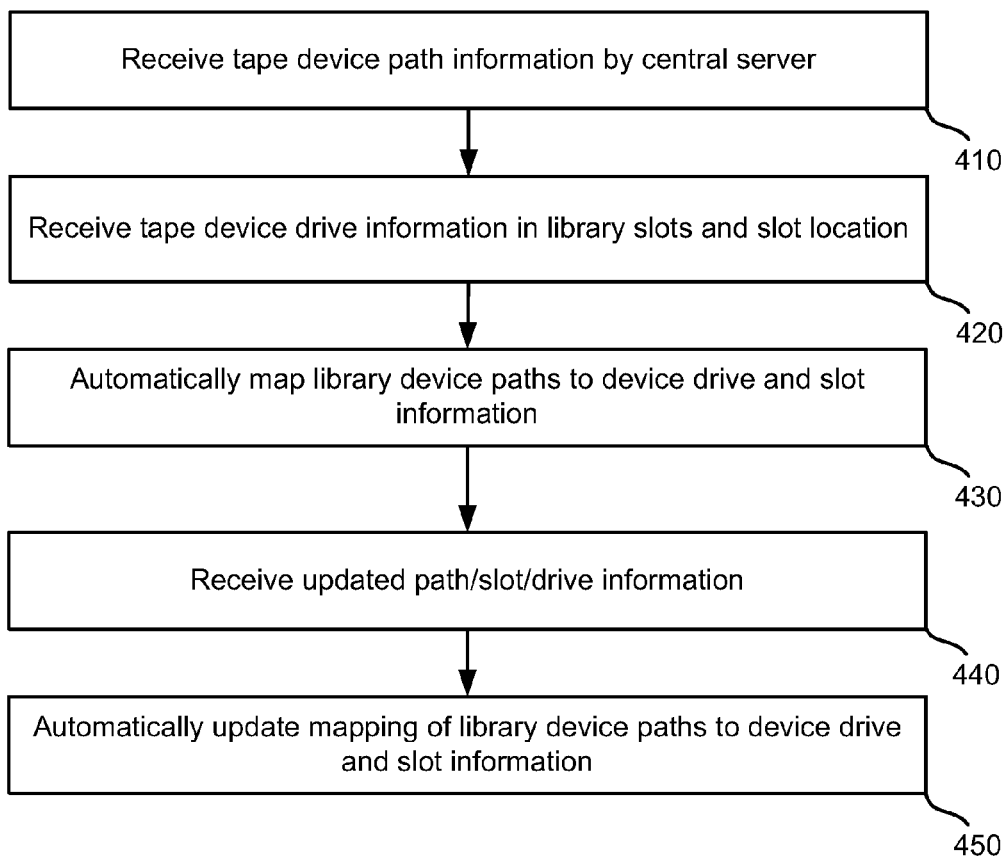
FIG. 4 is a method for automatically mapping tape device paths to tape devices.

FIG. 4 is a method for automatically mapping tape drive paths to tape drive devices. In some embodiments, the method of FIG. 4 may be performed by central server 170. First, a tape device path information is received by central server 210. In some embodiments, the information may be retrieved by central server 170 from data store 180. Tape device drive information in library slots as well as slot location information is received at step 220. Central server 170 may then automatically map library device paths to the device drive and slot information at step 230. Mapping the paths to the device drive and slot information results in a configuration of the tape drive cluster which provides information as to what device is in what slot and where those devices exist. Updated path, slot and/or drive information may be received at step 240. This information may be received as a result of the automatic reporting performed at step 370 in the method of FIG. 3. Mapping of library device paths to device drive and slot information is automatically updated in response to receiving updated information at step 250.

Figure 5:
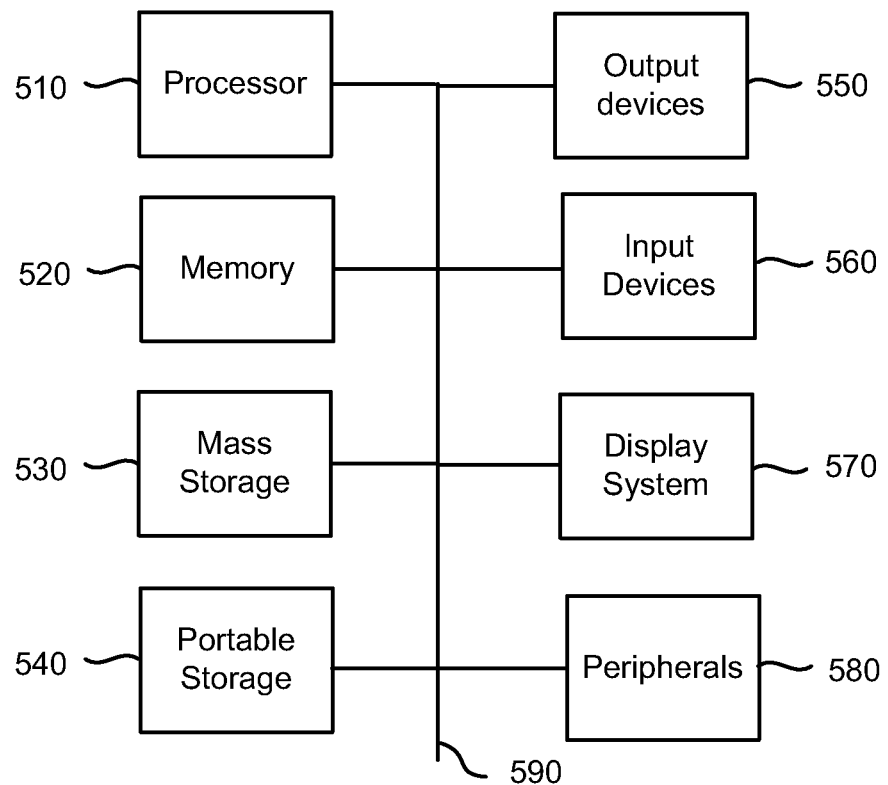
FIG. 5 is a block diagram of a computing device for implementing the present invention.

FIG. 5 illustrates a block diagram for implementing the present technology. System 500 of FIG. 5 may be implemented in the contexts of the likes of nodes 150 and 16, central server 170, and data store 180. The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims.

What is claimed is:

1. A method for automatically tracking tape drive paths, the method comprising:
receiving tape drive path information at a central server, wherein the received tape drive path information identifies a particular tape drive and a slot location that corresponds to the particular tape drive;
storing the tape drive path information at the central server; and
providing the tape drive path information to a node, wherein data may be retrieved from the slot location of the particular tape drive by the node in response to the tape drive path information.

2. The method of claim 1, wherein tape drive path information includes vendor, product, or serial number.

3. The method of claim 1, wherein tape drive information includes vendor, product or serial number of the particular tape drive that resides in a library slot.

4. The method of claim 1, wherein the tape drive path information is retrieved by a library control program.

5. The method of claim 1, wherein tape drive information is retrieved by a device control program.

6. The method of claim 1, further comprising:
receiving updated tape drive path, updated tape drive slot, or updated tape drive information; and
automatically updating the mapping based on the updated information.

7. A non-transitory computer readable storage medium having embodied thereon a program, the program being executable by a processor to perform a method for tracking tape drive paths, the method comprising:

receiving tape drive path information at a central server, wherein the received tape drive path information identifies a particular tape drive and a slot location that corresponds to the particular tape drive;

storing the tape drive path information at the central server; and providing the tape drive path information to a node, wherein data may be retrieved from the slot location of the particular tape drive by the node in response to the tape drive path information.

8. The non-transitory computer readable storage medium of claim 7, wherein the tape drive path information includes vendor, product or serial number.

9. The non-transitory computer readable storage medium of claim 7, wherein tape drive information includes vendor, product or serial number of the particular tape drive that resides in a library slot.

10. The non-transitory computer readable storage medium of claim 7, wherein the tape drive path information is retrieved by a library control program.

11. The non-transitory computer readable storage medium of claim 7, wherein tape drive information is retrieved by a device control program.

12. The non-transitory computer readable storage medium of claim 7, further comprising:

receiving updated tape drive path, updated tape drive slot, or updated tape drive information; and automatically updating the mapping based on the updated information.

* * * * *